United States Patent [19]

Lemoine et al.

[11] Patent Number: 5,602,539
[45] Date of Patent: Feb. 11, 1997

[54] BEARING WITH AN ELECTRIC-ACOUSTIC TRANSDUCER FOR TRANSMITTING INFORMATION REGARDING VARIOUS PARAMETERS WITHIN THE BEARING

[75] Inventors: Richard L. Lemoine, Harwinton; Richard W. Browner, Waterbury; John K. Pearson, Avon; Mark I. Jurras, III, Canton Center, all of Conn.

[73] Assignee: The Torrington Company, Torrington, Conn.

[21] Appl. No.: 518,086

[22] Filed: Aug. 22, 1995

[51] Int. Cl.[6] ............................................. G08B 21/00
[52] U.S. Cl. ........................ 340/870.16; 340/870.3; 340/682; 384/448
[58] Field of Search .................. 340/870.16, 870.17, 340/870.26, 870.3, 682; 384/448; 367/135, 137

[56] References Cited

U.S. PATENT DOCUMENTS

| | | | |
|---|---|---|---|
| 2,983,556 | 5/1961 | Coan. | |
| 4,778,286 | 10/1988 | Kadokawa | 340/682 |
| 4,949,072 | 8/1990 | Comerford et al. | 340/870.16 |
| 5,125,845 | 6/1992 | Benktander et al. | 439/16 |
| 5,145,379 | 9/1992 | Benktander et al. | 439/34 |
| 5,201,272 | 4/1993 | Simon | 340/682 |
| 5,446,452 | 8/1995 | Litton | 340/870.17 |

FOREIGN PATENT DOCUMENTS

WO-A-9413968  6/1994  WIPO.

Primary Examiner—Jeffery Hofsass
Assistant Examiner—Andrew Hill
Attorney, Agent, or Firm—John C. Bigler

[57] ABSTRACT

A bearing is mounted within a housing having an acoustic-electric transducer mounted on its outside. A stationary annular outer race has at least one sensor, an electric-acoustic transducer, and an electronic system interconnecting the sensor and the electric-acoustic transducer. The electric-acoustic transducer is mounted in an opening extending radially through the stationary race. The electric-acoustic transducer has an elastic cap pressed into the inside of the housing by a spring.

6 Claims, 2 Drawing Sheets

BEARING WITH AN ELECTRIC-ACOUSTIC TRANSDUCER FOR TRANSMITTING INFORMATION REGARDING VARIOUS PARAMETERS WITHIN THE BEARING

BACKGROUND OF THE INVENTION

This invention relates to bearings. More particularly, this invention is a bearing adapted to be mounted within a housing having an acoustic-electric transducer mounted on its outside. The bearing has an electric-acoustic transducer which receives electric signals indicating various parameters within the bearing and converts the electric signals into acoustic signals. These acoustic signals are detected by the acoustic-electric transducer mounted on the outside of the housing.

There are numerous bearing applications where the bearing is mounted in a housing that denies access to the bearing by servicing personnel. There are bearing performance characteristics that are best measured from inside the bearing for a number of different reasons. For instance, temperature-measurement devices are more responsive the closer they are to the source of heat generation. Vibration monitors are less affected by noise if they are installed inside the bearing. In using both of these types of sensors, a more reliable measurement is obtained if the sensor is permanently mounted within the bearing eliminating installation differences and misapplication of the sensor.

Furthermore, in applications where the bearing is transferred to a number of different locations during its life, the ability to maintain the historical data pertaining to an individual bearing is of great advantage in diagnosing bearing conditions.

While better measurements are obtained from within the bearing, the information must be made available to the personnel responsible for servicing the bearing for this information to be useful in diagnosing problems occurring in the bearing and surrounding equipment. Therefore, only if a method can be devised to relay this information out of the bearing will a measurement taken inside the bearing be of value.

The foregoing illustrates limitations known to exist in present devises and methods. Thus, it is apparent that it would be advantageous to provide am alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing adapted to be mounted within a housing having an acoustic-electric transducer mounted on its outside. The bearing comprises an annular rotatable race, an annular stationary race having a greater inside diameter than the outside diameter of the annular rotatable race, and a plurality of rollers located in the annular space between the races. At least one electric-acoustic transducer is mounted on the annular stationary race. The transducer has an elastic portion adapted to contact the housing to maximize the acoustic interface between the electric-acoustic transducer and the housing. Means are provided for pressing the elastic portion against the housing.

The foregoing and other aspects will become apparent from the following detailed description of the invention when considered in conjunction with the accompanying drawing figures.

BRIEF DESCRIPTION OF THE DRAWING FIGURES

FIG. 1 is a perspective view of a large bearing such as the large bearing used in steel mills with portions of the housing removed and portions of the inner race of the bearing removed in order to better illustrate the invention; and FIG. 2 is a cross-sectional view of one preferred embodiment of the electric-acoustic transducer of the invention.

DETAILED DESCRIPTION

In the various figures, like parts are referred to by like numbers.

Figure 1:
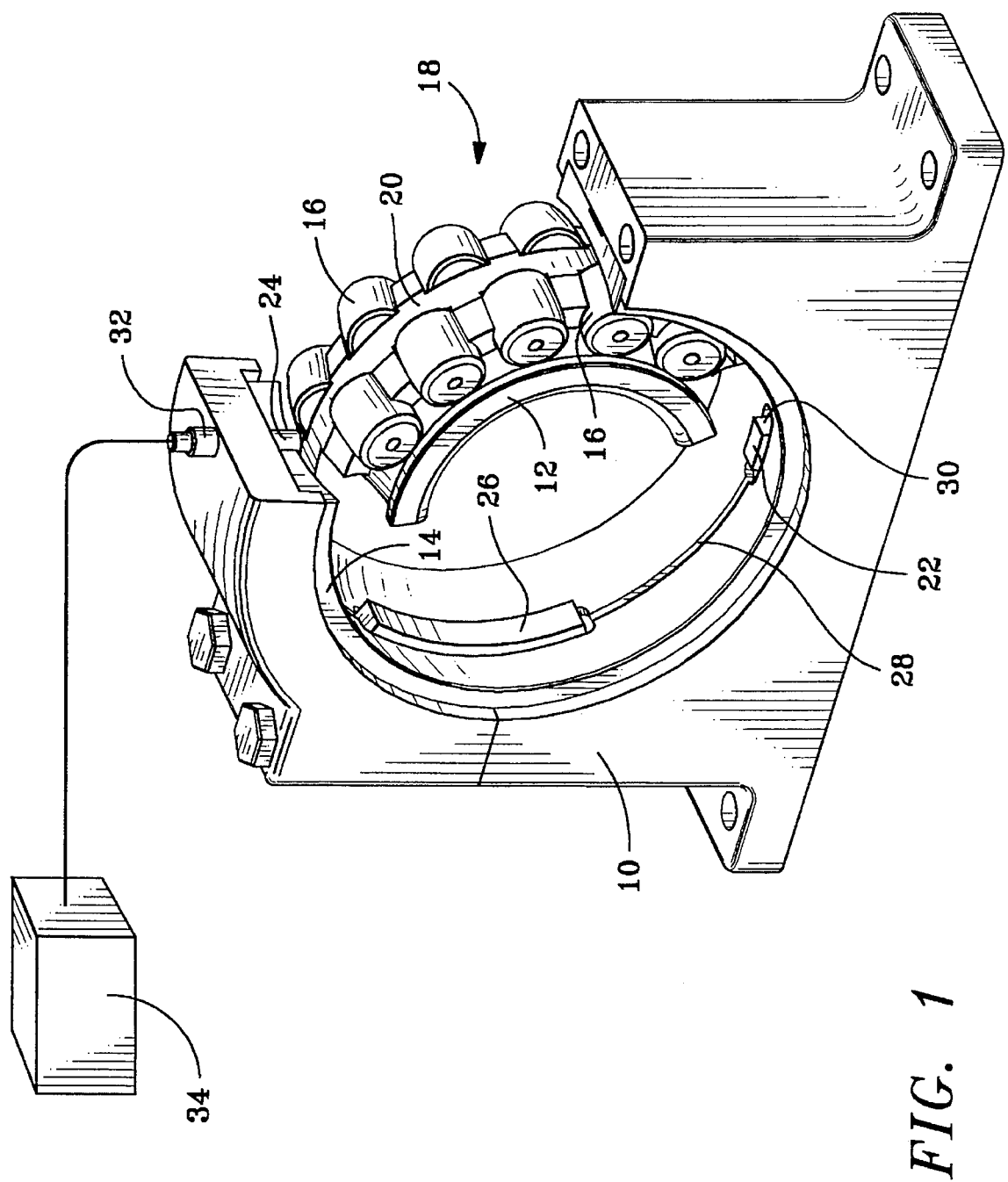

Referring to the drawings, and more particularly to FIG. 1, a housing 10 of the type used for supporting large bearings such as those used in steel mills is shown. A rotatable member 12 is rotatably mounted within the housing 10. As shown in FIG. 1, the rotatable member 12 is a rotatable race; however, it is to be understood that under some circumstances and with some bearings, rather than having a rotatable race, a rotatable shaft could extend entirely through the bore in the housing 10 and the shaft serve as a race. A portion of the annular rotatable race 12 is not shown in FIG. 1 so that the inventive features can be more clearly shown.

An annular stationary race 14 is also mounted within the housing 10. The race 14 has a greater inside diameter than the outside diameter of the race 12. A plurality of rollers 16 are located in the annular space between the race 12 and the race 14.

The rollers 16 are mounted within the roller pockets of the roller cage 18. The annular ring 20 of the annular cage 18 separates the rollers 16 into two axially spaced series of rollers.

A sensor 22 is located on the inside surface of the stationary annular race 14. In the drawings, one sensor is shown. However, the actual number of sensors is dependent on how much resolution is wanted and also on the size and length of the bearing and area to be sensed by the sensor. However, of course, at least one sensor must be used.

An electric-acoustic transducer 24 is located in the annular stationary race 14. The electric-acoustic transducer 24 is adapted to transmit acoustic signals through the housing 10. The acoustic signals are related to the parameter within the bearing.

The electronic system 26 interconnects the sensor 22 and the electric-acoustic transducer 24. In the embodiment shown in FIG. 1, a groove 28 extends partially around the inside surface of the stationary annular race 14. However, if desired, the groove may extend around the entire inside surface of the stationary annular race 14 for lower manufacturing costs. That part of the groove which extends from the electronic system 26 to the electric-acoustic transducer 24 is not shown in FIG. 1 because it is hidden by the stationary race 14. The sensor 22 is located in the pocket 30 in the inside surface of the stationary annular race 14. Wires extend along the groove 28 from the sensor 22 to the electronic system 26. Wires also extend from the electronic system 26 to the electric-acoustic transducer 24.

An acoustic-electric transducer 32 is mounted on the outside surface of the housing 10. In the embodiment shown the acoustic-electric transducer 32 is in-line with and radially spaced from the electric-acoustic transducer 24. Thus, the acoustic waves from the electric-acoustic transducer 24 are directly fed to the acoustic-electric transducer 32. The acoustic-electric transducer 32 is adapted to receive the acoustic signals transmitted by the electric-acoustic transducer 24 and convert these acoustic signals into electric signals related to the parameter within the bearing. The signals from the acoustic-electric transducer 32 are fed to the electronic system 34 which converts the output from the acoustic-electric transducer 32 into a value that will indicate the parameter within the bearing.

The word "parameter" as used in this description and in the claims is meant to include any value within the bearing which can be sensed electrically and the electric signals converted into corresponding acoustic signals. These values include, but are not limited to, temperatures, vibration, and load carried by the bearing.

Figure 2:
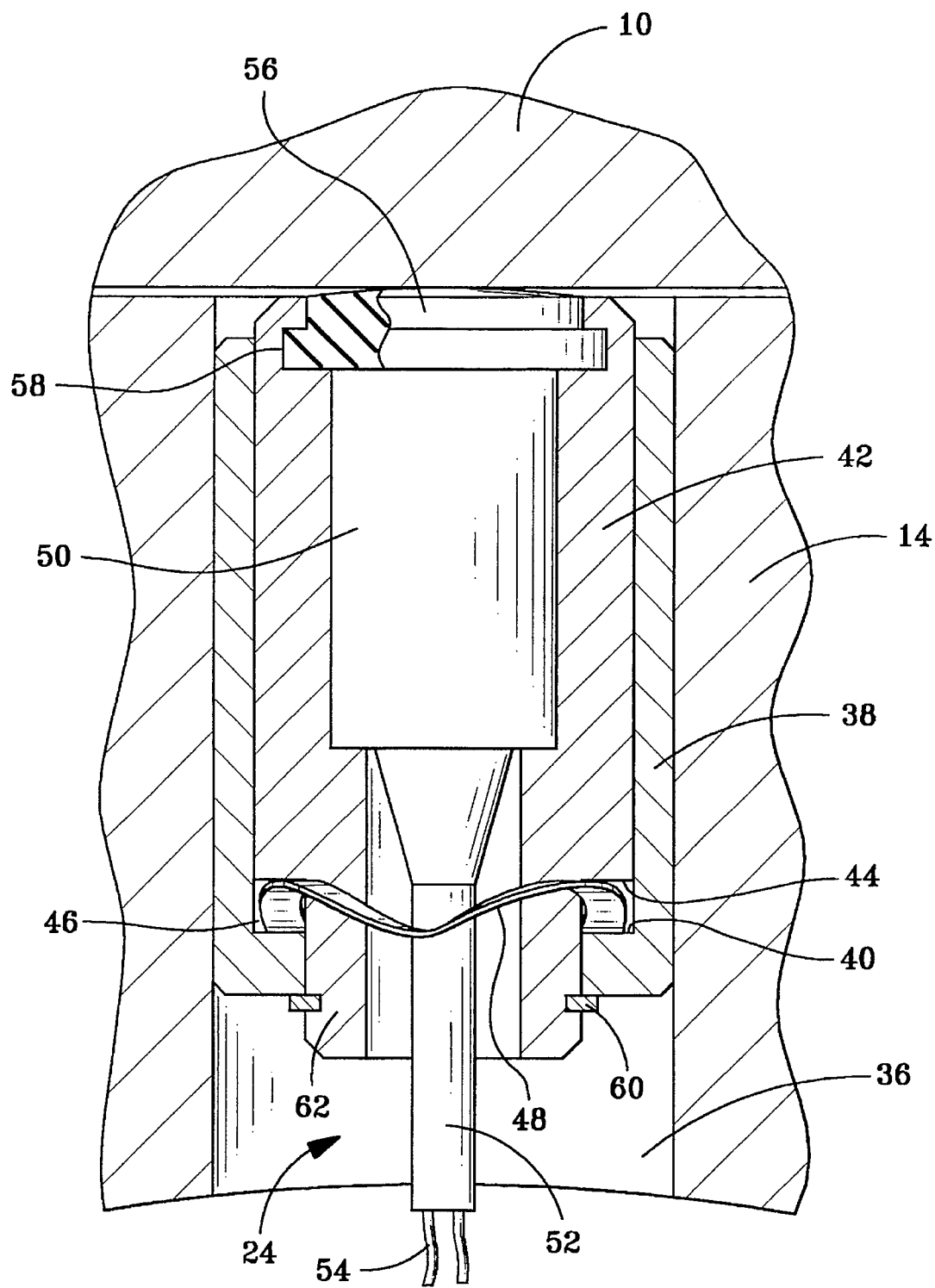

Referring to FIG. 2, the stationary race 14 has at least one cylindrical opening 36 extending radially from its inside surface to its outside surface. The electric-acoustic transducer 24 is mounted in the cylindrical opening 36. The electric-acoustic transducer has a cylindrical bushing 38. An annular upwardly facing shoulder 40 is located at the bottom of the bore of the bushing.

A sleeve 42 is mounted in the cylindrical bushing 38. The sleeve 42 has an annular downwardly facing shoulder 44 which is spaced above the bushing upwardly facing shoulder 40. This provides an annular recess 46. A wave spring 48 is mounted in the annular recess 46.

A cylindrical member 50 which contains a piezoelectric crystal is mounted in the sleeve 42. Member 50 receives the electric signals from the parameter sensing system through wires 54 and converts the electric signals into corresponding acoustic signals. Stem 52 is a potted compound that provides strain relief for the wires 54. The crystals included in the cylindrical member 50 may be any suitable crystal which undergoes mechanical deformation when an electrical field is applied on certain faces of the crystal. Suitable crystals include, but are not limited to, quartz, barium titanate, zirconate titanate, and lead.

An elastic or elastomeric cap 56 is mounted in the top of the sleeve 42. The sleeve is provided with an annular groove in which the larger diameter portion 58 of the cap 56 is fitted. The top of the cap 56 extends upwardly beyond the top of the sleeve 42 in order to be adapted to contact the inside of the housing 10.

The bottom of the cap 56 is in continuous contact with the top of member 50. Thus the arrangement of the cap 56 and the member 50 is such that the acoustic interface between the member 50 and the inside of the housing 10 is maximized.

A snap ring 60 is mounted within an annular groove around the smaller diameter portion 62 of the sleeve 42. This smaller diameter portion extends below the bottom of the bushing 38. The wave spring 48 wraps around the smaller diameter portion 62 of the sleeve 42. Wave spring 48 applies a force against the downwardly facing shoulder 44 of the sleeve 42 to press the elastic cap 56 against the inside surface of the housing 10.

Having described the invention, what is claimed is:

1. A bearing adapted to be mounted within a housing having an acoustic-electric transducer mounted on its outside comprising:

an annular rotatable race;

an annular stationary race having a greater inside diameter than the outside diameter of the annular rotatable race;

a plurality of rollers located in the annular space between said races;

at least one electric-acoustic transducer mounted on the annular stationary race, said electric-acoustic transducer having an elastic portion adapted to contact the housing to maximize the acoustic interface between the electric-acoustic transducer and the housing and means for pressing the elastic portion against the housing; and means mounted on the annular stationary race for sensing a parameter within the bearing and feeding electric signals to the electric-acoustic transducer related to the value of the parameter sensed.

2. A bearing in accordance with claim 1 wherein:

the annular stationary race has an opening extending radially from its inside surface to its outside surface; and the electric-acoustic transducer is mounted in said opening.

3. A bearing in accordance with claim 2 wherein:

the means for pressing the elastic portion against the housing is a spring.

4. A bearing in accordance with claim 3 wherein:

the spring is a wave spring.

5. A bearing adapted to be mounted within a housing having an acoustic-electric transducer mounted on its outside comprising:

an annular rotatable race;

an annular stationary race having an inside diameter greater than the outside diameter of the annular rotatable race;

said stationary race having at least one cylindrical opening extending radially from its inside surface to its outside surface;

a plurality of rollers located in the annular space between said races;

an electric-acoustic transducer mounted in the annular stationary race cylindrical opening, said electric-acoustic transducer having a cylindrical bushing with an annular upwardly facing shoulder, a sleeve mounted in the cylindrical bushing, said sleeve having an annular downwardly facing shoulder spaced above the cylindrical bushing annular upwardly facing shoulder thus providing an annular recess, a wave spring mounted in said annular recess, a cylindrical member having a piezoelectric crystal mounted in said sleeve, and an elastic cap mounted in the top of said sleeve and in contact with said cylindrical member, whereby when the bearing is mounted within the housing, the elastic cap is pressed against the housing;

and means mounted on the annular stationary race for sensing a parameter within the bearing and feeding electric signals to the electric-acoustic transducer related to the value of the parameter sensed.

6. In combination:

a housing;

a bearing within said housing having an annular rotatable race and an annular stationary race having a greater inside diameter then the outside diameter of the annular rotatable race;

a plurality of rollers located in the annular space between said races;

at least one sensor located on the inside surface of the stationary race for sensing a parameter within the bearing;

an electric-acoustic transducer mounted in the annular stationary race, said electric-acoustic transducer being adapted to transmit acoustic signals through said housing related to the parameter sensed by said sensor and having an elastic portion adapted to contact the housing to maximize the acoustic interface between the electric-acoustic transducer and the housing, and means for pressing the elastic portion against the housing;

an electronic system interconnecting said sensor and said electric-acoustic transducer;

at least one acoustic-electric transducer mounted on the outside surface of said housing, said acoustic-electric transducer being adapted to receive the acoustic signals transmitted by said electric-acoustic transducer and convert said acoustic signals into electric signals related to the parameter within the bearing; and an electronic system connected to the acoustic-electric transducer for indicating the value of the parameter sensed by the sensor.

* * * * *